J. N. JOHNSON.
MEANS FOR RELIEVING THE WALLS OF RECEPTACLES FROM UNDUE INTERNAL PRESSURE.
APPLICATION FILED MAY 13, 1912.
1,059,370. Patented Apr. 22, 1913.
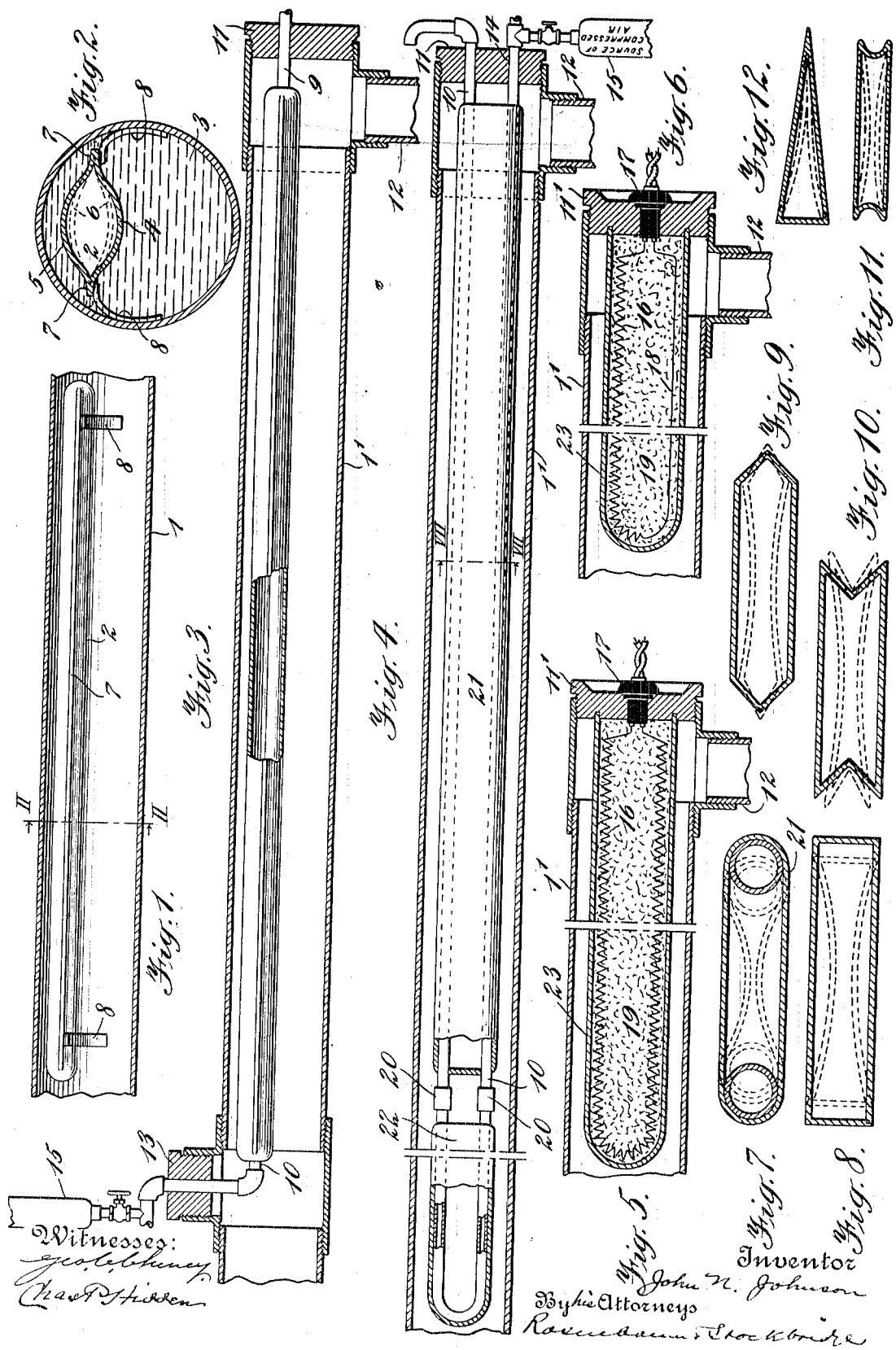

UNITED STATES PATENT OFFICE.

JOHN N. JOHNSON, OF ALBUQUERQUE, NEW MEXICO.

MEANS FOR RELIEVING THE WALLS OF RECEPTACLES FROM UNDUE INTERNAL PRESSURE.

1,059,370.  Specification of Letters Patent.  Patented Apr. 22, 1913.

Application filed May 13, 1912. Serial No. 696,869.

*To all whom it may concern:*

Be it known that I, JOHN N. JOHNSON, a citizen of the United States, residing at Albuquerque, in the county of Bernalillo and State of New Mexico, have invented certain new and useful Improvements in Means for Relieving the Walls of Receptacles from Undue Internal Pressure, of which the following is a full, clear, and exact description.

This invention relates to a novel pressure relief means for preserving receptacles from injury when subjected to undue internal pressures; and more particularly to means of this general description adapted for use in connection with mains or pipes which may be filled with a liquid, such as water, which expands when undergoing a change in its physical state or condition, as for example, upon the conversion of water to ice.

The invention while adapted to many uses is of particular value in preventing pipes filled with water from bursting when subjected to freezing temperatures; and the exemplifications thereof herein described and illustrated in the accompanying drawings, which form a part hereof, relate more especially to constructions adapted to this preferred use.

My invention also contemplates the provision of means for not only relieving the revision of means for not only relieving the receptacle or pipe to which they are applied from undue stress, but further aims to expedite the thawing out of the frozen material so as to enable the pipe, conduit or the like to resume its proper function.

These and other objects of my invention will be hereinafter referred to and the novel elements and combinations of elements whereby said objects may be attained will be more particularly set forth in the appended claims.

I may here state that I am aware of various changes and modifications which may be made in my invention without departing from the spirit thereof, and I hence desire to be limited only by the scope of the said claims.

In the drawings, in which like reference characters designate like parts throughout the several views, I have shown several forms of my device, but these forms are to be considered merely as by way of illustration.

In said drawings: Figure 1 is a longitudinal, vertical, median section of a pipe with a deformable or yielding hollow body therewithin. Fig. 2 is a transverse vertical section of the structure shown in Fig. 1, the section being taken on line II—II of said figure. Fig. 3 is a longitudinal, vertical section of a pipe or conduit provided with a similar yielding body, but having also means co-acting therewith for supplying heat thereto. Fig. 4 is a similar section of still another modification showing a slightly modified deformable body or rather a plurality of the same, said bodies being provided with heating means and auxiliary apparatus. Fig. 5 is a similar view of a still further modification, the heating means in the present instance being electrical. Fig. 6 is again a similar section showing a further modification of the electrical heating device. Fig. 7 is a transverse section of a deformable body shown in Fig. 4, the section being taken on line VII—VII of said figure. Fig. 8 is a transverse section of a modification of the deformable or yielding body shown in Fig. 2. Figs. 9, 10, 11 and 12 are similar sections of still other modifications of the said body.

A very simple form of the device has been shown in Figs. 1 and 2, wherein a pipe 1 contains a hermetically sealed tube or body broadly designated 2. This body is made preferably of material of relatively high tensile strength, which is inherently resilient. In practice I prefer to make such bodies of spring steel, drawn or rolled copper or the like and the walls thereof should be of sufficient strength to resist the pressure to which they may normally be subjected by the fluid 3 in the pipe. Bodies of this description should preferably be hollow although I do not desire to be limited to such construction, the essential feature being that they may be deformed comparatively readily, when subjected to undue strain or pressure, so that they will occupy less space then they normally do; while after the excess pressure is relieved they should be able of themselves, and without extraneous influence, to resume their normal shape. The presence of air in the tube or body is therefore merely an incident. Soft rubber pipes or the like are impracticable on account of their necessarily short life. In the present invention when steel tubes are immersed in liquid which might corrode or rust the same, they should be galvanized or otherwise treated or coated to preserve them. Drawn or rolled copper or brass bodies are preferable in many cases, but I do not wish to be restricted to metal since other materials such as celluloid or the like may be employed.

The deformable body shown in Fig. 2 consists of two halves respectively designated 4, 5; and each of these halves is bowed so that in cross section the body has substantially the form of a mouth. When this body is subjected to pressure it is obvious that the sides thereof will be driven toward each other, as indicated by the dotted lines 6 in said figure, the seams or other jointures or edges 7 upon the respective sides of the body, being driven apart. Assuming now that the pipe has been filled with water and that this body has been positioned therein, preferably by anchoring the same against displacement by the water as by means of spring clips 8, and that the temperature of the water is then lowered below its freezing point. Water in congealing into ice expands and would ordinarily tend to burst the pipe 1. The deformation of the body 2 is sufficient however to accommodate this increased bulk of the now congealed matter and the pipe is relieved from such excessive stress as might disrupt the same. It is obvious, of course, that many different shapes may be given to this deformable body and I have exemplified in Figs. 7, 8, 9, 10, 11 and 12 a few of these forms. The manner of deformation of these bodies may, of course, be different, for whereas in Fig. 2 the over all width of the body is increased when pressure is applied to the lateral walls thereof, in Fig. 7 this width is actually decreased, this being due to the fact that the lateral walls are initially flat or substantially so, rather than outwardly bowed, and when they are bowed inwardly toward each other the width of the body is decreased. The deformable structure shown in Fig. 8 behaves in a corresponding fashion, while that in Fig. 9 is, in a measure, intermediate in its action between the structure shown in Fig. 2 and that shown in Fig. 8; in this case the relatively extended walls are flat and may hence be bowed toward each other, but what may be termed the edge walls are angular and, since the body as a whole is resilient, it will, when deformed, assume the shape indicated in dotted lines in Fig. 9. The remaining figures need scarcely be discussed since the action of the deformable or collapsible structure is in each case much the same. I may mention, however, that it is almost practically impossible to use a cylindriform or spherical body since in such cases the material, offering as it does the same resistance to deformation at all points therearound, cannot be depended upon to deform properly under the excess pressure.

I have shown a number of forms in order to demonstrate the fact that with the exceptions noted no particular shape or conformation is necessary; the essential feature being that when the body is deformed its volume is decreased.

Fig. 3 shows a body which in cross section may be the same as that shown in Fig. 2, for example. Into either end of this resilient and more or less collapsible structure is secured a pipe; said pipes being respectively designated 9 and 10. The conduit or outer pipe 1' in the present case is closed at one extremity by a plug 11 the said extremity being connected to a downwardly or laterally extending pipe 12, which if desired may lead to a faucet or the like in a well known manner. The pipe 9 projects outwardly through a suitable orifice in the plug 11 while the pipe 10, the sections of which may be connected together by quarter turns as shown, project outwardly through a plug 13 in the side of the conduit. This construction provides not only a resilient collapsible or deformable body by means of which the excess pressure in the pipe or conduit may be relieved; but further provides means for thawing out the pipe 1' after the ice has formed therein; steam or hot water being admitted, for example, through the pipe 10 and passing out through the pipe 9. As the ice melts the water therefrom will drain off through the pipe 12 if the latter be downwardly directed. The collapsible or deformable body in this instance therefore, performs a dual function. It will be understood that when the deformable body thus itself constitutes a part, at least, of the means for conveying or inclosing the heat supplying medium, e. g. steam or water, that when collapsed there should still be space therein for the passage of such fluids. In Fig. 4 I have exemplified a plurality of these collapsible bodies arranged serially in the pipe or conduit 1' the construction of which latter is in many respects much the same as that in the instance previously discussed. In this case, however, instead of extending one of the pipes through which the steam, hot water or other heating medium is passed, laterally through the wall of the conduit, both the inlet and outlet pipes for the heating medium are passed out through the plug 11; the hot water, for example, being introduced through pipe 10, and passing successively through the bodies 21—22, then coursing around in the latter of these and returning to emerge through the plug 11 at 14; thus completing a circuit through the bodies. If desired, in order to remove the hot water or condensed steam from the said pipe 10 or compressible body, compressed fluid such as air, may be blown therethrough, the latter being delivered from a tank 15 or other source of the same. The heating pipe in the form of device shown in Fig. 3 may, of course, also be provided with a compressed air tank 15, if desired. The collapsible bodies in the form of device exemplified in Fig. 4 also perform a dual function in that they are not only deformable but further serve as casings for the heating means extending therethrough. In this form of the device, if the heating pipes 10 be not initially spaced slightly from the side walls of the body, said pipes should be adapted to bend or yield when the body is deformed, as shown by the dotted lines in Fig. 7.

It is obvious, of course, that various heating means may be employed in lieu of those previously referred to. For example, suitable electrically heated wires 16 may be disposed within the collapsible body 23, as shown in Fig. 5. In this case the latter may have any desired cross section which will adapt it for the purpose in question and the wires are led in through an insulating bush or socket 17 which extends through the plug 11'. I have shown the body 23 as being directly connected to this plug, the latter hence serving to anchor said body. Heating by means of the electric current in the manner shown in Fig. 6 is particularly adapted for use in connection with pipes of extended length. Herein, while the conductor or heating wire 16 may be bent or otherwise formed so as to afford the requisite resistance the return wire 18 may be straight and of low resistance; thus but one side being used for heating long tubes. The heating current may be drawn from any convenient source of the same, as for example from a lighting circuit. In Figs. 5 and 6 I have shown a mass of compressible material 19 within the deformable bodies 23, this material in the present instance being asbestos fiber or other insulating material which is adapted to efficiently insulate the conductive wires from said bodies. It is to be understood, however, that these latter may themselves be of insulating material, if desired.

The collapsible or deformable bodies are preferably anchored in the receptacles or pipes within which they are disposed, but the manner of so doing and of connecting said bodies, when they are connected, is, in the broadest aspects of the invention, immaterial. There are, however, certain advantages to be derived from using the pipes which convey the heating medium as the connecting and anchoring means, as shown in Fig. 4, for example; but I do not desire to be limited to any specific disposition or form of supporting or attaching device or devices since it is clearly obvious that many forms of the same may be employed.

While I do not desire to be limited to any specific proportion or ratio of the volume of the collapsible body or bodies to the receptacle or pipe in which they are disposed; where the liquid subject to congelation is water I have estimated that theoretically the volume of the collapsible bodies should be about one-eighth of that of the pipe or receptacle. In practice, however, I prefer to make said bodies usually of from one-fifth to one-sixth the volume of the pipe. They are intended to be inserted into water pipes, for example, in places where freezing is liable and they should preferably extend through the pipe wherever the latter is exposed to freezing temperatures. The pipe, of course, may be of any length and the deformable body may be tubular as shown in Fig. 1, or there may be a series of the same connected together, if desired, as indicated in Fig. 4, or in any other suitable manner.

I have shown connecting means, i. e. the connection 20, in Fig. 4 for joining the bodies together, said means also in this instance serving as the means for connecting the respective sections of the pipe 10 together.

What I particularly desire to emphasize is the fact that by thus making the deformable bodies of highly resilient material I am enabled to construct the device in the simplest possible and most durable manner.

Having thus described my invention, what I claim is:

1. The combination of a receptacle with pressure relief means for the same, said means comprising a deformable body in said receptacle adapted to be appreciably deformed only by a determined abnormal pressure in the medium within said receptacle in contact with said body, and means for heating said body.

2. The combination of a receptacle with pressure relief means for the same, said means comprising a deformable body in said receptacle adapted to be appreciably deformed only by a determined abnormal pressure in the medium within said receptacle in contact with said body, means for heating said body, and means for anchoring said heating means with respect to said receptacle.

3. The combination of a receptacle with pressure relief means for the same, said means comprising a deformable body in said receptacle adapted to be appreciably deformed only by a determined abnormal pressure in the medium within said receptacle in contact with said body, and combined anchoring and heating means for said body.

4. Means for relieving the walls of a water pipe from excessive pressure when the water therein is converted to ice, said means comprising a deformable tubular body, said body being other than circular in cross-section and adapted for insertion into said pipe, and means for heating said body when in place in said pipe.

5. Means for relieving the walls of a water pipe from excessive pressure when the water therein is converted to ice, said means comprising a deformable tubular body, said body being other than circular in cross-section and adapted for insertion into said pipe, means for heating said body when in place in said pipe, said heating means including a pipe adapted to convey a heating fluid, said last mentioned pipe being of less size than said water pipe.

6. Means for relieving the walls of a water pipe from excessive pressure when the water therein is converted to ice, said means comprising a deformable tubular body, said body being other than circular in cross-section and adapted for insertion into said pipe, and means for heating said body when in place in said pipe, said heating means including a pipe adapted to convey a heating fluid, said last mentioned pipe being of less size than said water pipe and having also an effective cross-sectional area less than that of said tubular body.

7. Means for relieving the walls of a water pipe from excessive pressure when the water therein is converted to ice, said means comprising a deformable body adapted for insertion into said pipe, in combination with means for heating said body whereby to melt said ice.

8. Means for relieving the walls of a water pipe from excessive pressure when the water therein is converted to ice, said means comprising a deformable body adapted for insertion into said pipe, in combination with means for heating said body whereby to melt said ice, said heating means including a pipe for conveying a heated fluid, said last mentioned pipe connected to said body whereby to support the same.

9. Means for relieving the walls of a water pipe from excessive pressure when the water therein is converted to ice, said means comprising a deformable body adapted for insertion into said pipe, in combination with means for heating said body whereby to melt said ice, said heating means including a pipe for conveying a heated fluid, and means for expelling said fluid from said last mentioned pipe.

In witness whereof, I subscribe my signature, in the presence of two witnesses.

JOHN N. JOHNSON.

Witnesses:
WM. WATSON,
H. B. RAY.